US008482578B2

(12) United States Patent
Zhao

(10) Patent No.: US 8,482,578 B2
(45) Date of Patent: Jul. 9, 2013

(54) DEVICE AND METHOD FOR ACCESSING VIDEO CAPTURING EQUIPMENT INTO SECONDARY GENERATION NETWORK

(75) Inventor: Kai Zhao, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,714

(22) PCT Filed: Sep. 16, 2009

(86) PCT No.: PCT/CN2009/073963
§ 371 (c)(1),
(2), (4) Date: Nov. 17, 2011

(87) PCT Pub. No.: WO2010/133053
PCT Pub. Date: Nov. 25, 2010

(65) Prior Publication Data
US 2012/0050610 A1 Mar. 1, 2012

(30) Foreign Application Priority Data

May 20, 2009 (CN) .......................... 2009 1 0084137

(51) Int. Cl.
*G09G 5/02* (2006.01)
*G09G 5/36* (2006.01)
*H04N 11/20* (2006.01)
*H04N 7/00* (2011.01)
*H04N 5/46* (2006.01)
*H04N 1/40* (2006.01)
*H04N 7/173* (2011.01)
*H04N 7/16* (2011.01)
*G03F 3/08* (2006.01)
*G06K 9/36* (2006.01)
*G06K 9/54* (2006.01)
*G06F 13/00* (2006.01)

(52) U.S. Cl.
USPC ........... 345/600; 345/603; 345/547; 348/441; 348/552; 348/558; 358/518; 358/523; 358/525; 358/448; 382/162; 382/276; 382/305; 711/100; 725/118; 725/145

(58) Field of Classification Search
USPC ................. 345/589, 600, 603, 601, 606, 612, 345/618–619, 522, 538, 547–549; 348/441, 348/467, 469, 488, 517, 552, 555, 558, 584; 358/518–519, 523–525, 445, 448; 382/166–167, 382/162, 254, 274, 276, 305; 711/100, 111, 711/123; 725/105, 110, 114–115, 118, 139, 725/145
See application file for complete search history.

(56) References Cited

U.S. PATENT DOCUMENTS 6,608,628 B1 * 8/2003 Ross et al. .................... 345/619
(Continued)

FOREIGN PATENT DOCUMENTS
| CN | 1681288 A | 10/2005 |
| CN | 101232609 A | 7/2008 |
| JP | 2000209556 A | 7/2000 |

OTHER PUBLICATIONS

International Search Report for PCT/CN2009/073963 dated Feb. 1, 2010.

*Primary Examiner* — Wesner Sajous
(74) *Attorney, Agent, or Firm* — Ling Wu; Stephe Yang; Ling and Young Intellectual Property

(57) ABSTRACT

A device which accesses a video capturing equipment into a next generation network is disclosed in the present invention. The device includes a setting module for reading image formats supported by a video capturing equipment, setting a captured image format of the video capturing equipment according to the image formats and storing the captured image format; a receiving module for receiving an image; a format determining module for reading the stored captured image format; and a converting module for converting the received image from the corresponding image format to an image format supported by the next generation network and outputting the converted image to the next generation network. A method for accessing a video capturing equipment into a next generation network is also disclosed in the present invention.

16 Claims, 2 Drawing Sheets

U.S. PATENT DOCUMENTS

| | | |
|---|---|---|
| 6,970,579 B1 | 11/2005 | Thornton |
| 2002/0145659 A1* | 10/2002 | Kim .......................... 348/14.12 |
| 2002/0191104 A1* | 12/2002 | Matsutani et al. ............ 348/441 |
| 2004/0114172 A1* | 6/2004 | Ohyama et al. ............. 358/1.13 |
| 2005/0114901 A1* | 5/2005 | Yui et al. ....................... 725/100 |
| 2006/0007353 A1* | 1/2006 | Matsutani et al. ............ 348/441 |
| 2006/0146786 A1* | 7/2006 | Lian et al. ..................... 370/352 |
| 2007/0154173 A1* | 7/2007 | Kim et al. ....................... 386/83 |
| 2007/0248324 A1* | 10/2007 | Itani ................................. 386/95 |
| 2010/0171817 A1* | 7/2010 | Tourapis et al. ................ 348/51 |
| 2011/0090904 A1* | 4/2011 | Zhao et al. .................... 370/352 |
| 2011/0262106 A1* | 10/2011 | Yahata .......................... 386/248 |

* cited by examiner

DEVICE AND METHOD FOR ACCESSING VIDEO CAPTURING EQUIPMENT INTO SECONDARY GENERATION NETWORK

TECHNICAL FIELD

The present invention relates to the technique of video image format conversion, and in particular, to a device and method for accessing a video capturing equipment into a next generation network.

BACKGROUND OF THE RELATED ART

IMS (IP Multimedia Subsystem) and other next generation networks support the image formats of CIF (Common Intermediate Format) type of which the corresponding pels are over 704*576, that are the image formats of CIF type of which pels are not lower than the pels corresponding to 4CIF and the high-definition image formats of 720P type and 1080P type. Therefore, it is required for the video capturing equipment accessed into IMS and other next generation networks to support the image format of which pels are not lower than the pels corresponding to 4CIF or 720P, 1080P, thus there is the problem that only the specific video capturing equipment which supports the image format of CIF type or high-definition image format but costs highly can be accessed into IMS and other next generation networks, so IMS and other next generation networks can only be applied in the professional fields such as supervisory in order to make the return of technique, finance and the like not lower than the investment, which limits the extension of applied scope of IMS and other next generation networks.

CONTENT OF THE INVENTION

For the above reasons, the mainly object of the present invention is to provide a device and method for accessing a video capture equipment into a next generation network, enabling a common household video capturing equipment to access into the next generation network.

For achieving the above object, the technical solution of the present invention is implemented as follows:

A device for accessing a video capturing equipment into a next generation network, and the device comprises: a setting module, a receiving module, a format determining module and a converting module; wherein, the setting module is configured to read image formats supported by the video capturing equipment from the video capturing equipment, set a captured image format of the video capturing equipment according to the read image formats, and store the captured image format;

the receiving module is configured to receive an image transmitted by the video capturing equipment, instruct the format determining module to read the stored captured image format from the setting module when the image is received, and transmit the received image to the converting module;

the format determining module is configured to read from the setting module the stored captured image format which is an image format corresponding to the image received by the receiving module;

the converting module is configured to convert the received image transmitted by the receiving module from the corresponding image format to an image format supported by the next generation network, and output the converted image to the next generation network.

Furthermore, the device further comprises a first parameter reading module and a color mode converting module; wherein, the first parameter reading module is configured to read a color mode supported by the video capturing equipment from the video capturing equipment and store the color mode;

the color mode converting module is configured to read the stored color mode from the first parameter reading module to obtain the color mode corresponding to the image received by the receiving module; and convert the color mode corresponding to the received image to RGB24 when the color mode corresponding to the received image is not RGB24.

Furthermore, the setting module comprises: a second parameter acquiring module, a highest pels determining module, a judging module and a storing module; wherein, the second parameter acquiring module is configured to read image formats supported by the video capturing equipment from the video capturing equipment;

the highest pels determining module is configured to determine the highest pels among the pels corresponding to the read image formats;

the judging module is configured to judge whether the determined pels are lower than pels corresponding to SVGA, and set the captured image format of the video capturing equipment as SVGA when the judging result is "not lower", set the captured image format of the video capturing equipment as an image format corresponding to the determined pels when the judging result is "lower";

the storing module is configured to store the captured image format.

Furthermore, the captured image format is SVGA, VGA (Video Graphics Array), CIF or QVGA (Quarter VGA).

Furthermore, the converting module comprises: a first converting module and an accessing module; wherein, the first converting module is configured to, when the image format obtained by the format determining module is SVGA, VGA or QVGA, acquire the received image from the receiving module, and compute difference for the image to obtain an image of which pels are close to those of an object format; and cut width of the obtained image to obtain a converted image;

the accessing module is configured to output the converted image into the next network.

Furthermore, the first converting module is further configured to:

when the image format supported by the next generation network is 4CIF, obtain an image of which pels are close to those of the object format which is an image of which pels are 768*576 close to those of 4CIF, and cut the width of the obtained image to obtain a converted image of which the image format is 4CIF; or when the image format supported by the next generation network is 720P, obtain an image of which pels are close to those of the object format which is an image of which pels are 1280*1152 close to those of 720P, and cut the width of the obtained image to obtain a converted image of which the image format is 720P; or when the image format supported by the next negation network is 1080P, obtain an image of which pels are close to those of the object format which is an image of which pels are 1920*1440 close to those of 1080P, and cut the width of the obtained image to obtain a converted image of which the image format is 1080P.

Furthermore, the converting module comprises: a second converting module and an accessing module; wherein, the second converting module is configured to:

when the image format obtained by the format determining module is CIF and the image format supported by the next generation network is 4CIP, acquire the received image from the receiving module, and compute difference for the image to obtain a converted image of which the image format is 4CIF; or when the image format obtained by the format determining module is CIF and the image format supported by the next generation is 720P or 1080P, acquire the received image from the receiving module, and compute the difference for the image to obtain an image of which pels are 1280*1047 close to those of 720P or 1920*1571 close to those of 1080P respectively, then further obtain a converted image of which the image format is 720P or 1080P respectively through cutting;

the accessing module is configured to output the converted image into the next generation network.

Furthermore, the converting module comprising the first converting module and accessing module further comprises a second converting module; wherein the second converting module is configured to:

when the image format obtained by the format determining module is CIF and the image format supported by the next generation network is 4CIF, acquire the received image from the receiving module, and compute the difference for the image to obtain the converted image of which the image format is 4CIF; or when the image format obtained by the format determining module is CIF and the image format supported by the next generation is 720P or 1080P, acquire the received image from the receiving module, and compute the difference for the image to obtain an image of which pels are 1280*1047 close to those of 720P or 1920*1571 close to those of 1080P respectively, then further obtain a converted image of which the image format is 720P or 1080P respectively through cutting.

The present invention further provides a method for accessing a video capturing equipment into a next generation network, the method comprises:

reading image formats supported by an video capturing equipment from the video capturing equipment, setting a captured image format of the video capturing equipment according to the read image formats and storing the captured image format; and, receiving an image transmitted by the video capturing equipment, reading the stored captured image format to obtain an image format corresponding to the received image; and converting the received image from a corresponding image format to an image format supported by the next generation network, and outputting the converted image to the next generation network.

Furthermore, the method further comprises: reading a color mode supported by the video capturing equipment and storing the color mode;

after the step of receiving an image transmitted by the video capturing equipment, the method further comprising: reading the stored color mode to obtain a color mode corresponding to the received image;

when the color mode corresponding to the image is not RGB24, before the step of reading the stored captured image format, the method further comprising: converting the color mode corresponding to the received image to RGB24.

Furthermore, the step of setting the captured image format of the video capturing equipment according to the read image formats comprises:

determining the highest pels among pels corresponding to the read image formats, judging whether the determined pels are lower than pels corresponding to SVGA; setting the captured image format of the video capturing equipment as SVGA if the determined pels are not lower than the pels corresponding to SVGA; setting the captured image format of the video capturing equipment as an image format corresponding to the determined pels if the determined pels are lower than the pels corresponding to SVGA.

Furthermore, the captured image format is SVGA, VGA, CIF or QVGA.

Furthermore, the image format supported by the next generation network is 4CIF, 720P or 1080P.

Furthermore, when the image format corresponding to the received image is SVGA, VGA or QVGA, the step of converting the image from the corresponding image format to the image format supported by the next generation network comprises:

when the image format supported by the next generation network is 4CIF, computing difference for the received image to obtain an image of which pels are 768*576, cutting width of the obtained image of which pels are 768*576 to obtain a converted image of which the image format is 4CIF; or when the image format supported by the next generation network is 720P or 1080P, firstly computing the difference for the received image to obtain an image of which pels are 1280*1152 close to those of 720P or 1920*1440 close to those of 1080P respectively, then further obtaining a converted image of which the image format is 720P or 1080P respectively through cutting.

Furthermore, when the image format corresponding to the received image format is CIF, the step of converting the image from the corresponding image format to the image format supported by the next generation network comprises:

when the image format supported by the next generation network is 4CIF, computing the difference for the received image to obtain a converted image of which the image format is 4CIF; or when the image format supported by the next generation network is 720P or 1080P, firstly computing the difference for the received image to obtain an image of which pels are 1280*1047 close to those of 720P or 1920*1571 close to those of 1080P respectively, then further obtaining a converted image of which the image format is 720P or 1080P respectively through cutting.

The device and method provided by the present invention for accessing a video capturing equipment into a next generation network, through converting the captured image by the video capturing equipment from the corresponding image format to the image format supported by the next generation network, make a common household video capturing equipment able to access into the next generation network, and benefit for the extension of the applied scope of the next generation network.

PREFERRED EMBODIMENTS OF THE PRESENT INVENTION

Figure 1:
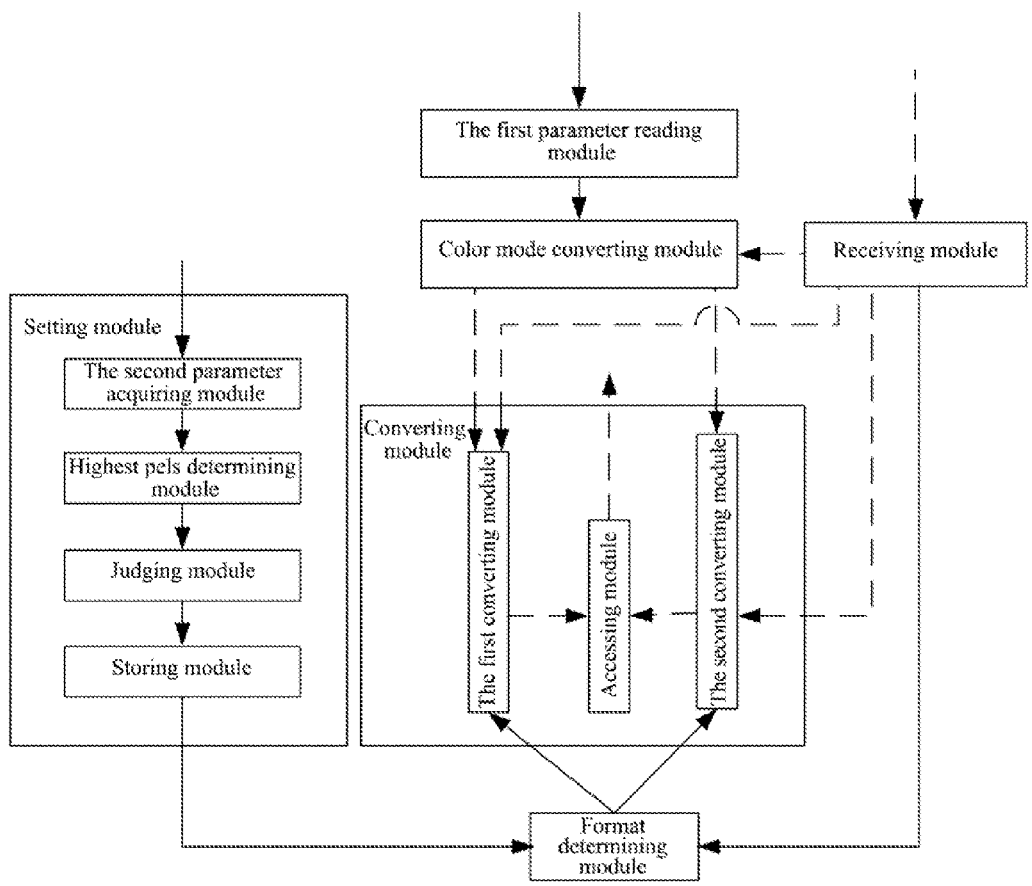
FIG. 1 is a structural diagram of the device which accesses a video capturing equipment into a next generation network in accordance with an embodiment of the present invention.

The structure of the device which accesses a video capturing equipment into a next generation network in accordance with an embodiment of the present invention is as shown in FIG. 1. The device comprises a setting module, a receiving module, a format determining module and a converting module; wherein, the setting module is used for reading image formats supported by the video capturing equipment from the video capturing equipment, setting the captured image format of the video capturing equipment according to the read image formats; and storing the captured image format;

herein, the setting module works when said device in the present invention and the video capturing equipment are initialized, setting the captured image format for the video capturing equipment, i.e. setting the image format corresponding to the image captured by the video capturing equipment as the set captured image format;

wherein, said video capturing equipment is a common household video capturing equipment. Common household video capturing equipments which are familiar have the following several types according to their supported image formats: the common household video capturing equipments which support XGA, SVGA, VGA, CIF, QVGA etc., the common household video capturing equipments which support SVGA, VGA, CIF, QVGA etc., the common household video capturing equipments which support VGA, CIF, QVGA etc., the common household video capturing equipments which support CIF and the common household video capturing equipments which support QVGA;

the receiving module is used for receiving an image transmitted by the video capturing equipment; and is used for instructing the format determining module to read the stored captured image format when the image is received;

the format determining module is used for reading the captured image format which is stored by said setting module to obtain an image format corresponding to the received image;

wherein, the image format corresponding to the image captured by the video capturing equipment is the captured image format stored by said setting module, therefore, the image format corresponding to the image captured by the video capturing equipment, i.e. the image format corresponding to the received image, can be obtained by reading the captured image format stored by said setting module.

the converting module is used for converting the received image from the corresponding image format into an image format supported by the next generation network and outputting the converted image to the next generation network; wherein, the image format supported by the next generation network is the image format of CIF type of which corresponding pels are not lower than the pels corresponding to 4CIF or the high-definition image format of 720P or 1080P type.

The device further comprises a first parameter reading module and a color mode converting module; wherein, the first parameter reading module is used for reading a color mode supported by the video capturing equipment from the video capturing equipment and storing the color mode;

the color mode converting module is used for reading the stored color mode to obtain the color mode corresponding to the received image, and converting the color mode corresponding to the received image to RGB24 when the color mode corresponding to the received image is not RGB24.

The existing displays mostly adopt RGB color standard, therefore, here the color mode corresponding to the image is converted into RGB24 for display convenience.

Wherein, said setting module comprises a second parameter acquiring module, a highest pels determining module, a judging module and a storing module; wherein, the second parameter acquiring module is used for reading image formats supported by the video capturing equipment;

the highest pels determining module which is used for determining the highest pels among the pels corresponding to each read image format;

the judging module is used for judging whether the determined pels are not lower than the pels corresponding to SVGA, and setting the captured image format of the video capturing equipment as SVGA when the judging result is "not lower", otherwise setting the captured image format of the video capturing equipment as the image format corresponding to the determined pels;

herein, the workload of the video capturing equipment will be increased if the pels corresponding to the captured image format are higher than the pels corresponding to SVGA, therefore, the captured image format of the video capturing equipment is set as SVGA when the determined pels are higher than the pels corresponding to SVGA;

the storing module is used for storing the captured image format.

Wherein, said captured image format is SVGA, VGA, CIF or QVGA.

Said converting module comprises a first converting module, a second converting module, and an accessing module; wherein, the first converting module is used for, when the image format obtained by the format determining module is SVGA, VGA or QVGA, acquiring the received image, and computing the difference for the image to obtain an image of which the pels are close to those of the object format(such as 768*576 close to those of 4CIF, 1280*1152 close to those of 720P, 1920*1440 close to those of 1080P); and cutting the width of the obtained image of which pels are of the above three types to obtain an image of which the image format is 4CIF, 720P or 1080P respectively;

the second converting module is used for, when the image format obtained by said format determining module is CIF and the image format supported by said next generation network is 4CIF, acquiring the received image, and computing the difference for the image to obtain an image of which the image format is 4CIF; or the second converting module is used for, when the image format obtained by the format determining module is CIF and the image format supported by the next generation network is 720P or 1080P, firstly obtaining an image of which pels are 1280*1047 close to those of 720P or an image of which pels are 1920*1571 close to those of 1080P respectively by computing the difference, then further obtaining an image of which the image format is 720P or 1080P respectively through cutting;

the accessing module is used for outputting the converted image to the next generation network.

Figure 2:
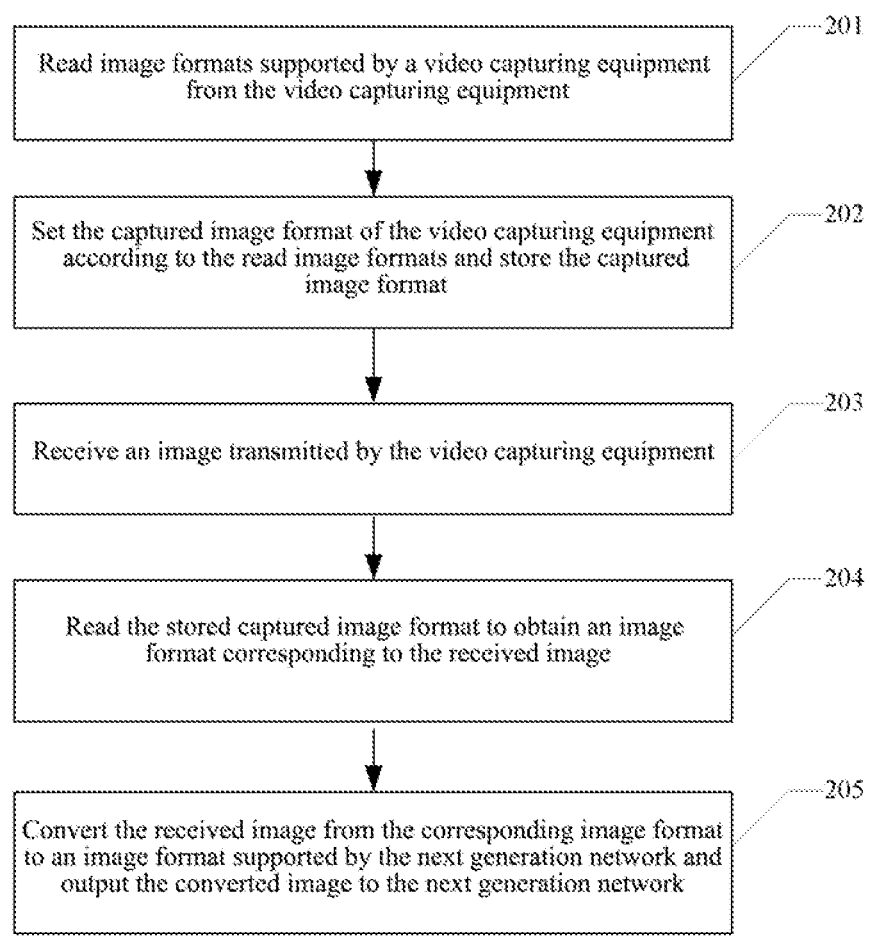
FIG. 2 is a flow chart of the method for accessing a video capturing equipment into a next generation network in accordance with an embodiment of the present invention.

The implementing flow of the method for accessing a video capturing equipment into a next generation network in accordance with an embodiment of the present invention is as shown in FIG. 2, comprising the following steps:

step 201: reading image formats supported by a video capturing equipment from the video capturing equipment;

herein, this step may further comprise: reading a color mode of the video capturing equipment from the video capturing equipment and storing the color mode.

step 202: setting the captured image format of the video capturing equipment according to the read image formats and storing the captured image format; wherein, said captured image format is SVGA, VGA, CIF or QVGA;

wherein, setting the captured image format of the video capturing equipment according to the read image formats is specifically as:

determining the highest pels among the pels corresponding to each read image format, judging whether the determined pels are not lower than the pels corresponding to SVGA; if not lower, setting the captured image format of the video capturing equipment as SVGA; if lower, setting the captured image format of the video capturing equipment as the image format corresponding to the determined pels.

Step 201 and step 202 are used for initializing said device in the present invention and the video capturing equipment, wherein, setting the captured image format for the video capturing equipment is: setting the image format corresponding to the image captured by the video capturing equipment as the set captured image format.

step 203: receiving an image transmitted by the video capturing equipment;

step 204: reading the stored captured image format to obtain an image format corresponding to the received image;

wherein, the image format corresponding to the image captured by the video capturing equipment is the captured image format stored by said setting module, therefore, the image format corresponding to the image captured by the video capturing equipment, i.e. the image format corresponding to the received image, can be obtained by reading the captured image format stored by the setting module.

Herein, this step may further comprise:

reading the stored color mode to obtain the color mode corresponding to the received image;

converting the color mode which corresponds to the received image to RGB24 when the obtained color mode is not RBG24.

step 205: converting the received image from the corresponding image format to an image format supported by the next generation network and outputting the converted image to the next generation network;

wherein, the image format supported by said next generation network is 4CIF, 720P, or 1080P.

herein, when the image format corresponding to the received image is SVGA, VGA or QVGA, said converting the received image from the corresponding image format to an image format supported by the next generation network is specifically as:

computing the difference for the image to obtain an image of which pels are close to those of the object format (such as: 768*576 close to pels of 4CIF, 1280*1152 close to pels of 720P, 1920*1140 close to pels of 1080P); and cutting the width of the obtained image of which pels are the above three types to obtain an image of which the image format is 4CIF, 720P or 1080P respectively; wherein, pels corresponding to said 4CIF is 704*576, pels corresponding to 720P is 1280*720, pels corresponding to 1080P is 1920*1080;

when the image format corresponding to the received image is CIF, said converting the image from the corresponding image format to an image format supported by the next generation network is:

computing the difference for the image to obtaining an image of which the image format is 4CIF when the image format supported by the next generation network is 4CIF;

firstly obtaining an image of which pels are 1280*1047 close to those of 720P or 1920*1571 close to those of 1080P respectively by computing the difference, then further obtaining an image of which the image format is 720P or 1080P respectively through cutting when the image format supported by the next generation network is 720P or 1080P.

The above said, is only the preferred embodiment of the present invention and is not intended to limit the protection scope of the present invention.

Industrial Applicability

The device and method provided by the present invention for accessing a video capturing equipment into a next generation network, through converting the image captured by the video capturing equipment from the corresponding image format to the image format supported by the next generation network, make a common household video capturing equipment able to access into the next generation network, benefit for the extension of the applied scope of the next generation network.

What I claim is:

1. A device for enabling a common household video capturing equipment accessing into a next generation multimedia network, the device comprising: a setting module, a receiving module, a format determining module and a converting module; wherein, the setting module is configured to read image formats supported by the video capturing equipment from the video capturing equipment, set a captured image format of the video capturing equipment according to the read image formats, and store the captured image format;

the receiving module is configured to receive an image transmitted by the video capturing equipment, instruct the format determining module to read the stored captured image format from the setting module when the image is received, and transmit the received image to the converting module;

the format determining module is configured to read from the setting module the stored captured image format which is an image format corresponding to the image received by the receiving module;

the converting module is configured to convert the received image transmitted by the receiving module from the corresponding image format to an image format supported by the next generation network, and output the converted image to the next generation network;

wherein, the setting module comprises: a second parameter acquiring module, a highest pels determining module, a judging module and a storing module; wherein, the second parameter acquiring module is configured to read image formats supported by the video capturing equipment from the video capturing equipment;

the highest pels determining module is configured to determine the highest pels among the pels corresponding to the read image formats;

the judging module is configured to judge whether the determined pels are lower than pels corresponding to SVGA, and set the captured image format of the video capturing equipment as SVGA when the judging result is "not lower", set the captured image format of the video capturing equipment as an image format corresponding to the determined pels when the judging result is "lower";

the storing module is configured to store the captured image format.

2. The device according to claim 1, further comprising a first parameter reading module and a color mode converting module; wherein, the first parameter reading module is configured to read a color mode supported by the video capturing equipment from the video capturing equipment and store the color mode;

the color mode converting module is configured to read the stored color mode from the first parameter reading module to obtain the color mode corresponding to the image received by the receiving module; and convert the color mode corresponding to the received image to RGB24 when the color mode corresponding to the received image is not RGB24.

3. The device according to claim 1, wherein, the captured image format is SVGA, VGA, CIF or QVGA.

4. The device according to claim 3, wherein, the converting module comprises:
a first converting module and an accessing module; wherein,
the first converting module is configured to, when the image format obtained by the format determining module is SVGA, VGA or QVGA, acquire the received image from the receiving module, and compute difference for the image to obtain an image of which pels are close to those of an object format; and cut width of the obtained image to obtain a converted image;
the accessing module is configured to output the converted image into the next network.

5. The device according to claim 4, wherein,
the first converting module is further configured to:
when the image format supported by the next generation network is 4CIF, obtain an image of which pels are close to those of the object format which is an image of which pels are 768*576 close to those of 4CIF, and cut the width of the obtained image to obtain a converted image of which the image format is 4CIF; or
when the image format supported by the next generation network is 720P, obtain an image of which pels are close to those of the object format which is an image of which pels are 1280*1152 close to those of 720P, and cut the width of the obtained image to obtain a converted image of which the image format is 720P; or
when the image format supported by the next negation network is 1080P, obtain an image of which pels are close to those of the object format which is an image of which pels are 1920*1440 close to those of 1080P, and cut the width of the obtained image to obtain a converted image of which the image format is 1080P.

6. The device according to claim 3, wherein, the converting module comprises:
a second converting module and an accessing module; wherein,
the second converting module is configured to:
when the image format obtained by the format determining module is CIF and the image format supported by the next generation network is 4CIP, acquire the received image from the receiving module, and compute difference for the image to obtain a converted image of which the image format is 4CIF; or
when the image format obtained by the format determining module is CIF and the image format supported by the next generation is 720P or 1080P, acquire the received image from the receiving module, and compute the difference for the image to obtain an image of which pels are 1280*1047 close to those of 720P or 1920*1571 close to those of 1080P respectively, then further obtain a converted image of which the image format is 720P or 1080P respectively through cutting;
the accessing module is configured to output the converted image into the next generation network.

7. The device according to claim 4, wherein, the converting module further comprises a second converting module; the second converting module is configured to:
when the image format obtained by the format determining module is CIF and the image format supported by the next generation network is 4CIF, acquire the received image from the receiving module, and compute the difference for the image to obtain the converted image of which the image format is 4CIF; or
when the image format obtained by the format determining module is CIF and the image format supported by the next generation is 720P or 1080P, acquire the received image from the receiving module, and compute the difference for the image to obtain an image of which pels are 1280*1047 close to those of 720P or 1920*1571 close to those of 1080P respectively, then further obtain a converted image of which the image format is 720P or 1080P respectively through cutting.

8. A method for enabling a common household video capturing equipment accessing into a next generation multimedia network, the method comprising:
reading image formats supported by an video capturing equipment from the video capturing equipment, setting a captured image format of the video capturing equipment according to the read image formats and storing the captured image format; and,
receiving an image transmitted by the video capturing equipment, reading the stored captured image format to obtain an image format corresponding to the received image; and
converting the received image from a corresponding image format to an image format supported by the next generation network, and outputting the converted image to the next generation network;
wherein, the step of setting the captured image format of the video capturing equipment according to the read image formats comprises:
determining the highest pels among pels corresponding to the read image formats, judging whether the determined pels are lower than pels corresponding to SVGA; setting the captured image format of the video capturing equipment as SVGA if the determined pels are not lower than the pels corresponding to SVGA; setting the captured image format of the video capturing equipment as an image format corresponding to the determined pels if the determined pels are lower than the pels corresponding to SVGA.

9. The method according to claim 8 further comprising: reading a color mode supported by the video capturing equipment and storing the color mode;
after the step of receiving an image transmitted by the video capturing equipment, the method further comprising: reading the stored color mode to obtain a color mode corresponding to the received image;
when the color mode corresponding to the image is not RGB24, before the step of reading the stored captured image format, the method further comprising: converting the color mode corresponding to the received image to RGB24.

10. The method according to claim 1, wherein, the captured image format is SVGA, VGA, CIF or QVGA.

11. The method according to claim 10, wherein, the image format supported by the next generation network is 4CIF, 720P or 1080P.

12. The method according to claim 11, wherein, when the image format corresponding to the received image is SVGA, VGA or QVGA, the step of converting the image from the corresponding image format to the image format supported by the next generation network comprises:
when the image format supported by the next generation network is 4CIF, computing difference for the received image to obtain an image of which pels are 768*576, cutting width of the obtained image of which pels are 768*576 to obtain a converted image of which the image format is 4CIF; or
when the image format supported by the next generation network is 720P or 1080P, firstly computing the difference for the received image to obtain an image of which pels are 1280*1152 close to those of 720P or 1920*1440 close to those of 1080P respectively, then further obtaining a converted image of which the image format is 720P or 1080P respectively through cutting.

13. The method according to claim 11, wherein, when the image format corresponding to the received image format is CIF, the step of converting the image from the corresponding image format to the image format supported by the next generation network comprises:

when the image format supported by the next generation network is 4CIF, computing the difference for the received image to obtain a converted image of which the image format is 4CIF; or when the image format supported by the next generation network is 720P or 1080P, firstly computing the difference for the received image to obtain an image of which pels are 1280*1047 close to those of 720P or 1920*1571 close to those of 1080P respectively, then further obtaining a converted image of which the image format is 720P or 1080P respectively through cutting.

14. The device according to claim 2, wherein, the setting module comprises: a second parameter acquiring module, a highest pels determining module, a judging module and a storing module; wherein, the second parameter acquiring module is configured to read image formats supported by the video capturing equipment from the video capturing equipment;

the highest pels determining module is configured to determine the highest pels among the pels corresponding to the read image formats;

the judging module is configured to judge whether the determined pels are lower than pels corresponding to SVGA, and set the captured image format of the video capturing equipment as SVGA when the judging result is "not lower", set the captured image format of the video capturing equipment as an image format corresponding to the determined pels when the judging result is "lower";

the storing module is configured to store the captured image format.

15. The device according to claim 5, wherein, the converting module further comprises a second converting module; the second converting module is configured to:

when the image format obtained by the format determining module is CIF and the image format supported by the next generation network is 4CIF, acquire the received image from the receiving module, and compute the difference for the image to obtain the converted image of which the image format is 4CIF; or when the image format obtained by the format determining module is CIF and the image format supported by the next generation is 720P or 1080P, acquire the received image from the receiving module, and compute the difference for the image to obtain an image of which pels are 1280*1047 close to those of 720P or 1920*1571 close to those of 1080P respectively, then further obtain a converted image of which the image format is 720P or 1080P respectively through cutting.

16. The method according to claim 9, wherein, the step of setting the captured image format of the video capturing equipment according to the read image formats comprises:

determining the highest pels among pels corresponding to the read image formats, judging whether the determined pels are lower than pels corresponding to SVGA; setting the captured image format of the video capturing equipment as SVGA if the determined pels are not lower than the pels corresponding to SVGA; setting the captured image format of the video capturing equipment as an image format corresponding to the determined pels if the determined pels are lower than the pels corresponding to SVGA.

* * * * *